United States Patent
Subramaniam et al.

(10) Patent No.: US 11,663,507 B2
(45) Date of Patent: May 30, 2023

(54) PREDICTING CUSTOM FIELDS FROM TEXT

(71) Applicant: Intuit Inc., Mountain View, CA (US)

(72) Inventors: Vignesh Thirukazhukundram Subramaniam, Bangalore (IN); Shrutendra Harsola, Madhya Pradesh (IN); Vikas Raturi, Uttar Pradesh (IN); Naveen Kumar Kaveti, Hyderabad (IN)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/364,857

(22) Filed: Jun. 30, 2021

(65) Prior Publication Data

US 2023/0004834 A1    Jan. 5, 2023

(51) Int. Cl.
*G06F 17/00* (2019.01)
*G06N 5/04* (2023.01)
*G06F 40/274* (2020.01)
*G06Q 30/0201* (2023.01)
*G06N 20/00* (2019.01)

(52) U.S. Cl.
CPC .............. *G06N 5/04* (2013.01); *G06F 40/274* (2020.01); *G06N 20/00* (2019.01); *G06Q 30/0201* (2013.01)

(58) Field of Classification Search
CPC ........ G06N 5/04; G06N 20/00; G06F 40/274; G06F 8/70; G06F 40/35; G06F 40/30; G06F 40/174; G06Q 30/201

USPC ........................................................ 715/256
See application file for complete search history.

(56) References Cited

U.S. PATENT DOCUMENTS

| | | | | |
|---|---|---|---|---|
| 7,343,551 | B1 * | 3/2008 | Bourdev ................. | G06F 40/30 715/224 |
| 11,151,195 | B1 * | 10/2021 | Beck ....................... | H04L 51/02 |
| 2008/0134038 | A1 * | 6/2008 | Oh ........................ | G06F 16/9535 704/E15.045 |
| 2010/0100804 | A1 * | 4/2010 | Tateishi .................. | G06F 16/21 715/225 |
| 2013/0339283 | A1 * | 12/2013 | Grieves ................. | G06F 3/0482 706/46 |
| 2017/0243132 | A1 * | 8/2017 | Sainani ................... | H04L 41/20 |
| 2017/0286525 | A1 * | 10/2017 | Li ........................... | G06N 20/00 |
| 2019/0361860 | A1 * | 11/2019 | Rogynskyy ............ | G06Q 50/01 |
| 2020/0210955 | A1 * | 7/2020 | Bar-on ............ | G06Q 10/06316 |

* cited by examiner

Primary Examiner — Jason T Edwards
(74) Attorney, Agent, or Firm — Ferguson Braswell Fraser Kubasta PC (57) ABSTRACT

A method predicts custom fields from text. Transaction text is normalized from transaction data to generate normalized text. A field prediction and a type prediction are selected using prediction data and the normalized text. The prediction data is generated using a machine learning model trained to identify field predictions from free form text. The field prediction and the type prediction are presented to a client device. In response to user input from the client device, the transaction data is updated with the field prediction.

20 Claims, 8 Drawing Sheets

PREDICTING CUSTOM FIELDS FROM TEXT

BACKGROUND

Transaction data includes descriptions of transactions between different entities. The transaction data for a transaction may include fields, custom fields, and free form text. The fields, which may be used by multiple users of the system, store information relevant to the transaction.

Custom fields store specific types of data for a particular user or group of users. Not all users make use of the same custom fields. Free form text may be entered by a user and is unstructured. The user may include information in the free form text that is relevant to a custom field. One challenge is to predict the names for the custom fields from information in the free form text.

SUMMARY

In general, in one or more aspects, the disclosure relates to a method that predicts custom fields from text. Transaction text is normalized from transaction data to generate normalized text. A field prediction and a type prediction are selected using prediction data and the normalized text. The prediction data is generated using a machine learning model trained to identify field predictions from free form text. The field prediction and the type prediction are presented to a client device. In response to user input from the client device, the transaction data is updated with the field prediction.

In general, in one or more aspects, the disclosure relates to a system that includes at least one server, a machine learning model, and an application, executing on the at least one server. Transaction text is normalized from transaction data to generate normalized text; A field prediction and a type prediction are selected using prediction data and the normalized text. The prediction data is generated using the machine learning model trained to identify field predictions from free form text. The field prediction and the type prediction are presented to a client device. In response to user input from the client device, the transaction data is updated with the field prediction.

In general, in one or more aspects, the disclosure relates to a method that predicts custom fields from text. Transaction text, for transaction data, is received as free form text from a client device responsive to the client device receiving the transaction text from an input field of a form displayed on the client device. The transaction text is normalized to generate normalized text. A field prediction and a type prediction are selected using prediction data and the normalized text. The prediction data is generated using a machine learning model trained to identify field predictions from the free form text. The field prediction and the type prediction are presented to the client device. The field prediction is displayed on the form.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure predict the names for custom fields from the free form text in transaction data. The system generates field predictions for the names of custom fields that may be added to a transaction. The type of data for the custom field is also predicted with a type prediction.

To generate the predictions, the system analyzes historical transaction data to generate prediction data. The historical transaction data is analyzed by normalizing text from transactions and normalizing the names of custom fields from the transactions. The system identifies the custom fields, and the data types thereof, that are commonly used. The system generates the prediction data for the commonly used custom field names and data types. The system then uses the prediction data to generate predictions from free form text in a transaction. The predictions are presented to the user. The prediction data may be continuously updated (e.g., daily) to provide relevant predictions for custom fields to the users of the system.

Figure 1:
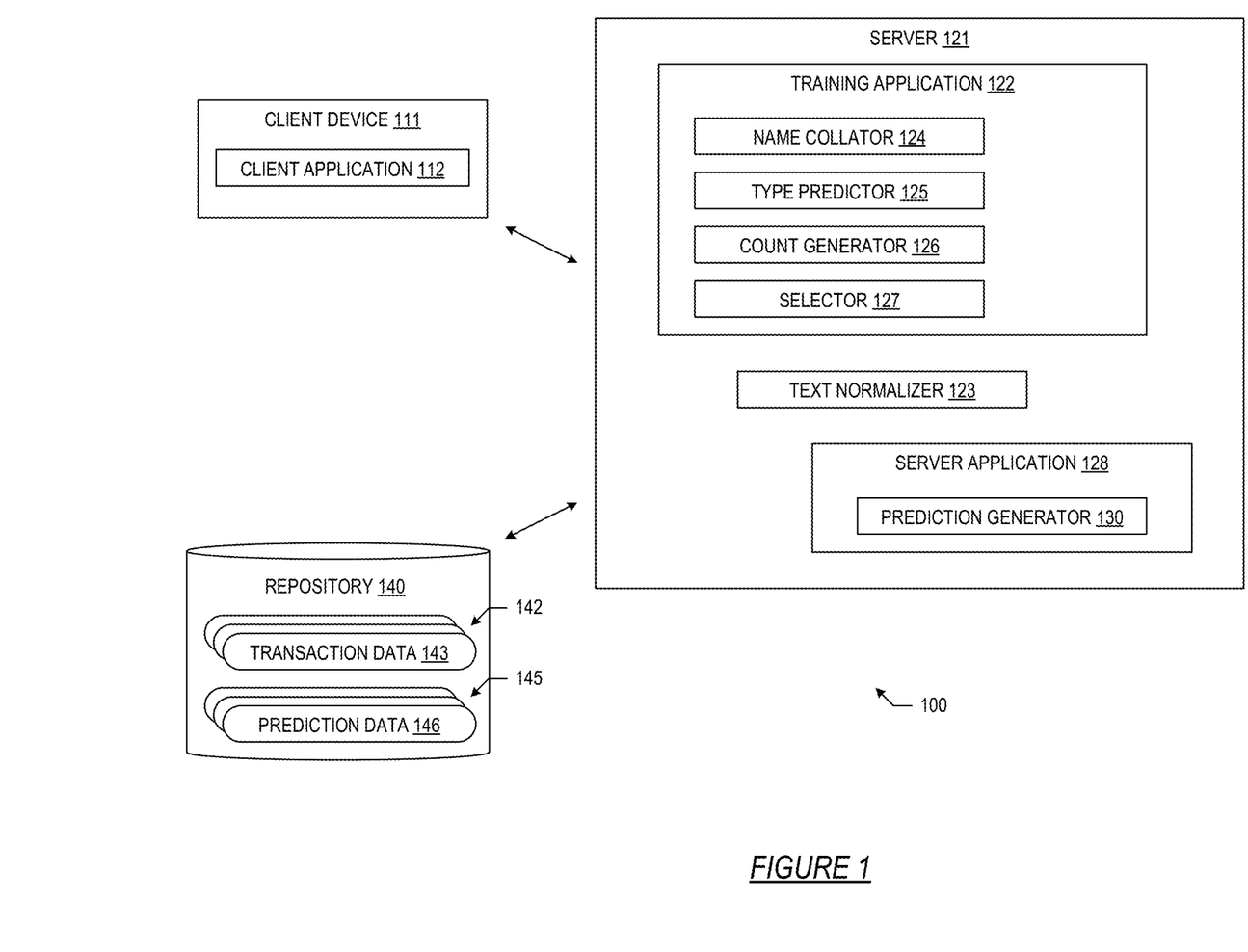
FIG. 1 shows diagrams of systems in accordance with disclosed embodiments.

FIG. 1 show a diagram of embodiments that are in accordance with the disclosure. FIG. 1 shows the system (100) that predicts custom fields from text. The embodiments of FIG. 1 may be combined and may include or be included within the features and embodiments described in the other figures of the application. The features and elements of FIG. 1 are, individually and as a combination, improvements to machine learning technology and computing systems. The various elements, systems, and components shown in FIG. 1 may be omitted, repeated, combined, and/or altered as shown from FIG. 1. Accordingly, the scope of the present disclosure should not be considered limited to the specific arrangements shown in FIG. 1.

Turning to FIG. 1, the system (100) predicts custom fields from free form text. The system (100) includes the server (121), the client device (111), and the repository (140). While depicted using a client server architecture, embodiments of the system (100) may be implemented on a single computing system.

Figure 4A:
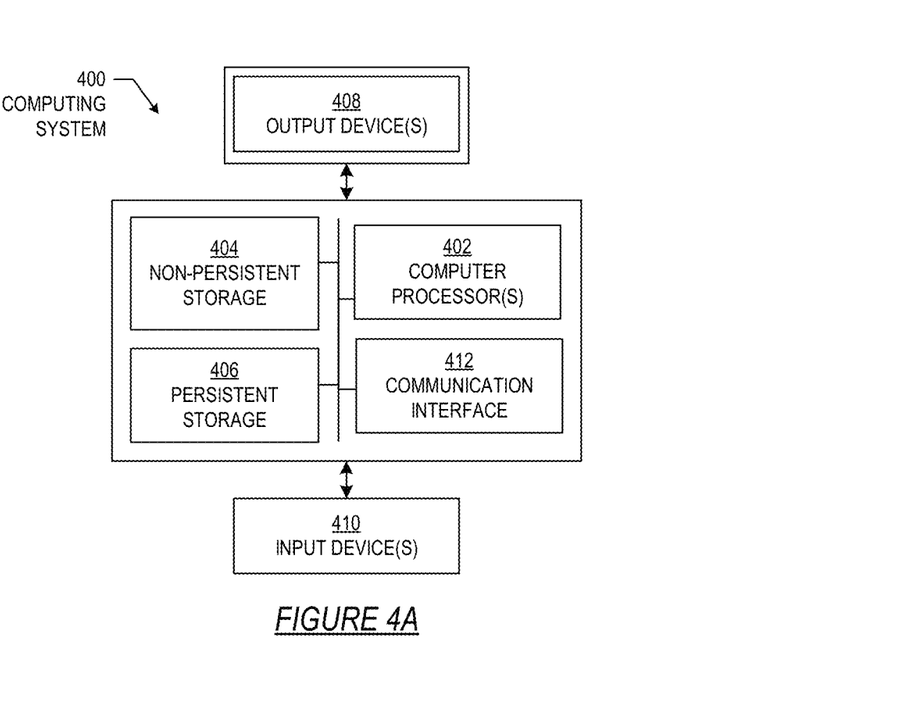
FIG. 4A and FIG. 4B show computing systems in accordance with disclosed embodiments.

The client device (111) is a computing systems (further described in FIG. 4A). Examples of the client device (111) include desktop computers, mobile devices, laptop computers, tablet computers, etc. The client device (111) includes the client application (112).

The client application (112) is a program running on the client device (111). The client application (112) is operated by a user to access the server application (128) to process transactions using online services that may be hosted by the server (121). The client application (112) displays predictions from the server application (128). The client application (112) may be a native application or may be a browser application that sends and receives messages to and from the applications hosted by the server (121).

The server (121) is a computing system (further described in FIG. 4A). The server (121) may include multiple physical and virtual computing systems that form part of a cloud computing environment. In one embodiment, execution of the programs and applications of server (121) is distributed to multiple physical and virtual computing systems in the cloud computing environment. In one embodiment, the server (121) includes the training application (122) and the server application (128). The training application (122) and the server application (128) may operate on different servers and be controlled by different parties, the same party, or combinations thereof.

The training application (122) is a program operating on the server (121) that generates the prediction data (145) from the transaction data (142). The training application uses the name collator (124), the type predictor (125), the count generator (126), and the selector (127). The training application (122) also uses the text normalizer (123).

The name collator (124) is a program that collates variants of a field name. In one embodiment, the name collator (124) receives a list of names and identifies the names that have the same or similar meaning. For example, with the list "sales rep", "sales representative", "sale rep", "sale reps", "account number", and "acct no", the names "sales rep", "sales representative", "sale rep", and "sale reps" have the same meaning and the names "account number" and "acct no" have the same meaning.

The type predictor (125) is a program that predicts the type (also referred to as a data type) of a custom field in the transaction data (142). In one embodiment, the type predictor determines, using the name of the field, whether the field is a numerical value, a date value, a string value, etc.

The count generator (126) is a program that generate counts of the field names used by custom fields. In one embodiment, the count generator (126) counts the number of times a custom field name appears in the free from text of the transactions for an entity.

The selector (127) is a program that selects a number of predictions for names of custom fields for an entity. In one embodiment, the selector (127) receives a list of possible predictions for custom field names and reduces the size of the list using a threshold (e.g., the five names with usages rates greater than the rest of the names).

The text normalizer (123) is a program that normalizes text. The text normalizer (123) may convert text to lower case, remove stop words and punctuation, trim white space, correct spelling, stem words, etc. The text normalizer (123) may be used by both the training application (122) and the server application (128).

The server application (128) is a program that predicts custom field names from the free form text in transactions. In one embodiment, the server application (128) hosts a website accessed by the client application (112). The server application (128) includes the prediction generator (130).

The prediction generator (130) is a program that predicts the name and type of a custom field based on normalized text from a transaction. In one embodiment, the prediction generator (130) receives normalized text of a transaction. From the normalized text, the prediction generator (130) generates the predicted names and types of one or multiple custom fields for the transaction using the prediction data (146) from the repository (140).

The repository (140) is a computing system that may include multiple computing devices in accordance with the computing system (400) and the nodes (422) and (424) described below in FIGS. 4A and 4B. The repository (140) may be hosted by a cloud services provider. The cloud services provider may provide hosting, virtualization, and data storage services as well as other cloud services and to operate and control the data, programs, and applications that store and retrieve data from the repository (140). The data in the repository (140) includes the transaction data (142) and the prediction data (145).

The transaction data (142), including the transaction data (143), includes records of transactions performed by users of the system. The transaction data (143) is the data for one transaction that is stored in the repository (140). In one embodiment, the transactions are financial transactions that identify the payor, payee, amount, and date. Each transaction includes several fields that each have a field name. Users of the system may include custom fields and custom field names for the data in the transactions in the transaction data (142). The transaction data (142) includes training transactions, which are historical transactions that may be used to train the system (100). The transaction data (142) may include transactions from multiple entities that use different customized field names for the same data (e.g., "sales rep", "sales representative", "sale rep", and "sale reps", may all have the same meaning). Each transaction in the transaction data (142) includes free form text that may be input by a user and recorded to the system (100). The free form text may include data for a custom field.

The prediction data (145), including the prediction data (146), includes the data used to generate predictions of the names and data types of custom fields for transactions. In one embodiment, the prediction data (146) is the data for one company and is stored in the repository (140). In one embodiment, the prediction data (145) includes a machine learning model. In one embodiment, the prediction data (145) may include an object file. The object file may be encoded in accordance with the JavaScript object notation standard.

Figure 2A:
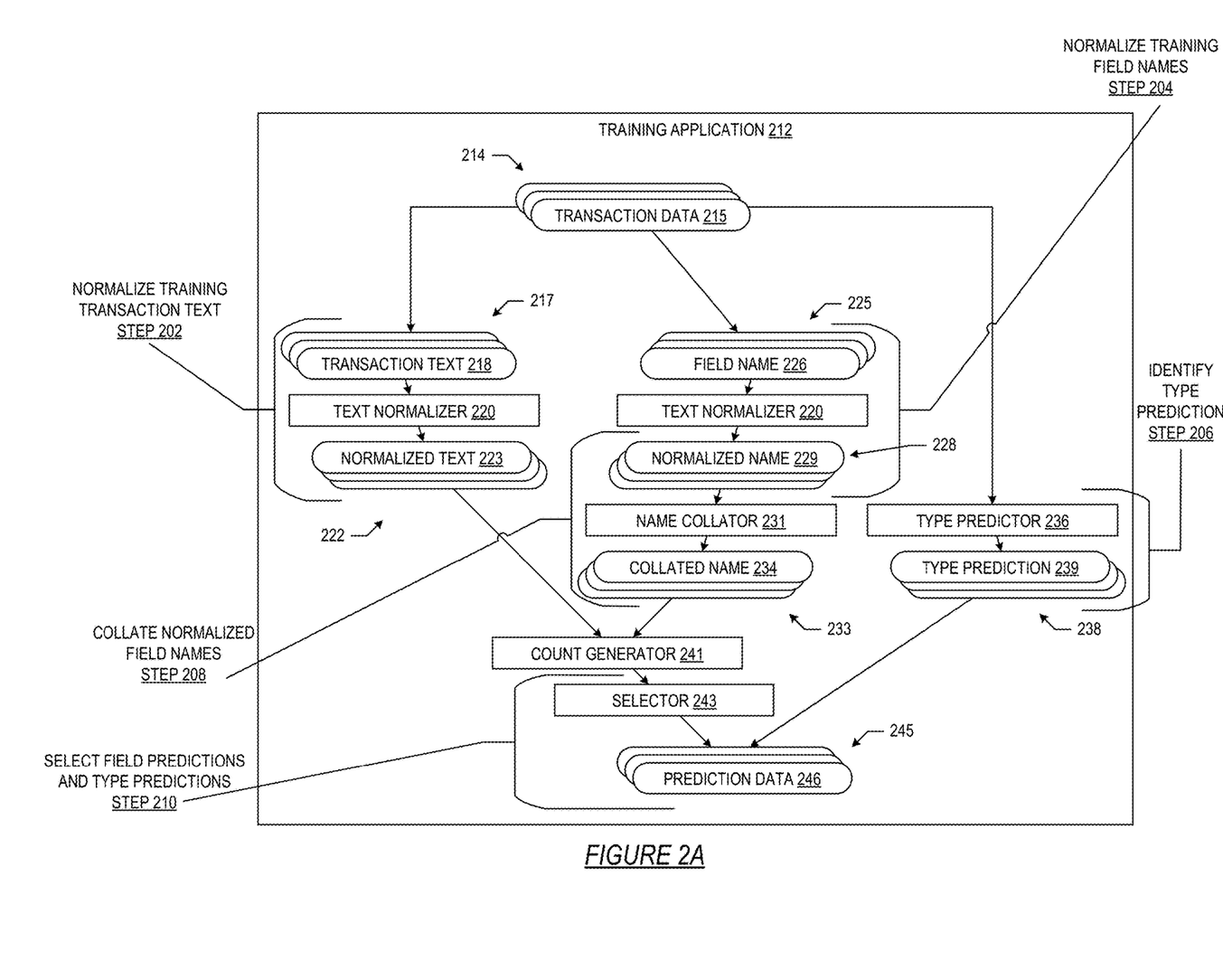
FIG. 2A and FIG. 2B show processes in accordance with disclosed embodiments.
Figure 2B:
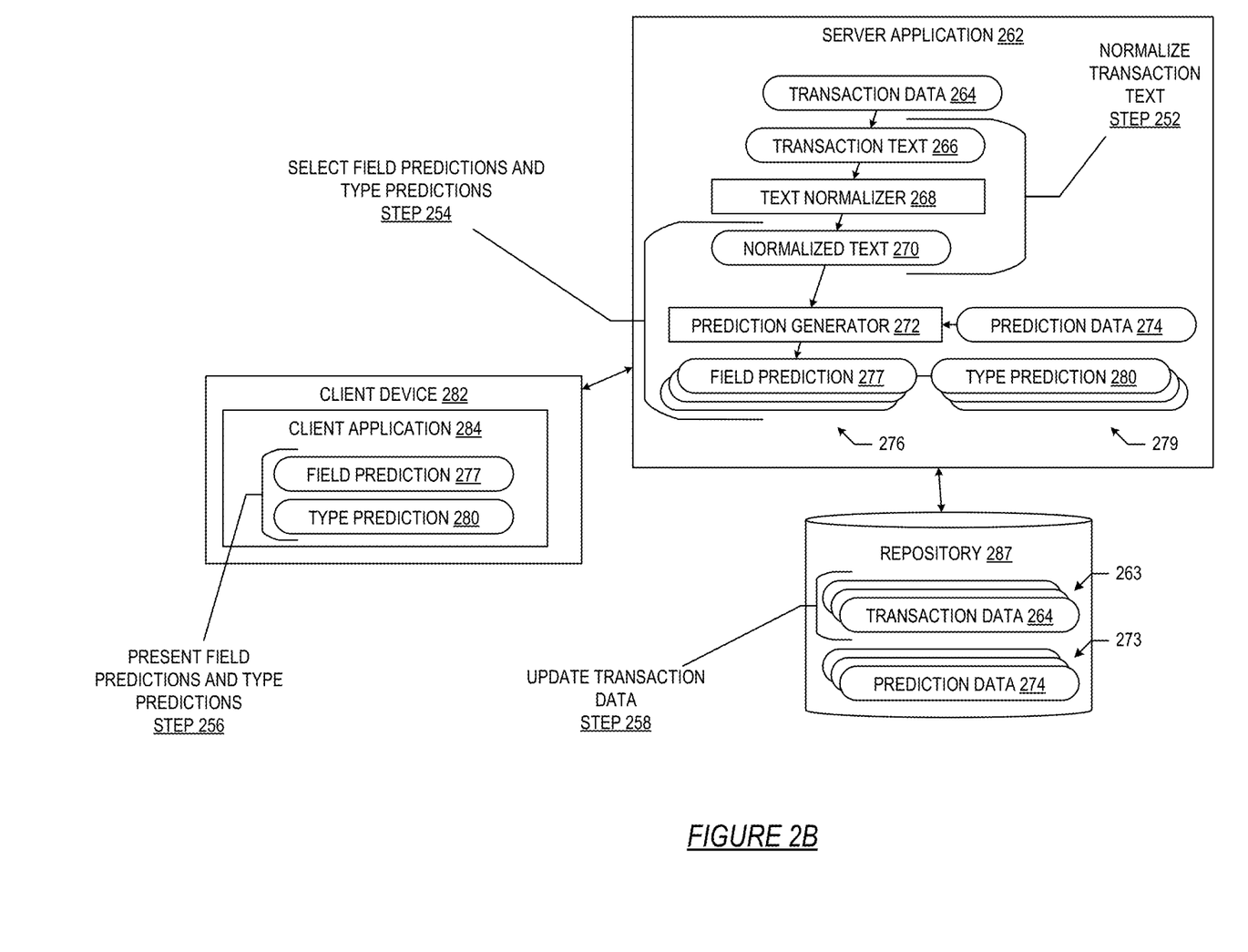

FIGS. 2A and 2B show data flows and diagrams of processes in accordance with the disclosure. FIG. 2A shows a process and data flow for training a machine learning model to make field predictions. FIG. 2B shows a process and data flow for using the field predictions to add custom fields to transaction data. The embodiments of FIGS. 2A and 2B may be combined and may include or be included within the features and embodiments described in the other figures of the application. The features of FIGS. 2A and 2B are, individually and as an ordered combination, improvements to machine learning technology and computing systems. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively. For example, some steps may be performed using polling or be interrupt driven. By way of an example, determination steps may not have a processor process an instruction unless an interrupt is received to signify that condition exists. As another example, determinations may be performed by performing a test, such as checking a data value to test whether the value is consistent with the tested condition.

Turning to FIG. 2A, the training application (212) generates the prediction data (245) from the transaction data (214). The training application (212) receives the transaction data (214) and extracts the transaction text (217) from the transaction data (214). The transaction text (218) is extracted from the transaction data (215). During training the transaction text (217) may be referred to as training transaction text.

The transaction text (218) may include text from multiple fields that is combined (e.g., concatenated). The text may be extracted from a "memo" field, which is a free form field of text into which a user of the system may input a description of the transaction. The transaction text (218) may also include text from a line item description. The transaction data (215) may include multiple line items that identify a product and each line item may include description text, an item identifier, and an amount. When the item identifier and an amount are null (i.e., a null item identifier and a null amount), the description text from the line item may be extracted from the transaction data (215) and included with the text from the "memo" field as the transaction text (218). In one embodiment, the description text and text from the memo field may be processed as separate transaction text items in the transaction text (217).

At Step 202, transaction text is normalized. The text normalizer (220) receives the transaction text (218) and generates the normalized text (223). The process is repeated for the transaction text (217) to generate the normalized text (222). The text normalizer (220) may apply multiple algorithms to the transaction text (218), including converting the text to lower case, removing stop words and punctuation (e.g., "is", "and", "are", "etc.", etc.), trimming white space (e.g., convert contiguous whitespace to a single space), spell correction, and normalization, and stemming. The normalization replaces known abbreviations and short hand with full words (e.g., "po #" replaced with "purchase order number"). Stemming replaces different versions of the same word with a single word or token. A token may be an integer that uniquely identifies a word in a vocabulary of words.

The field names (225) (also referred to as training field names during training) are extracted from the transaction data (214). The training field names include the names of custom fields from the transaction data (214). The field name (226) is one of the field names extracted from the transaction data (215).

At Step 204, training field names are normalized. The text normalizer (220) receives the field name (226) and generates the normalized name (229). The process is repeated for the field names (225) to generate the normalized names (228). The text normalizer (220) is again used to apply the same multiple algorithms to the training field names extracted from the transaction data (214).

At Step 206, type predictions are identified. The type predictions are identified by the type predictor (236) after generating the normalized names (229). In one embodiment, the type predictor (236) identifies the number of times a particular data type (string, floating point value, integer value, etc.) is used for a custom field from the transaction data (214).

For each custom field, the number of times the field is used to store numerical values (referred to as the number of numeric values) and the number of times the field used to store any value (referred to as the total number of values) are computed. A ratio for the numerical values is computed by dividing the number of numeric values by the total number of values. If the ratio exceeds a predefined threshold value, then the type prediction is a numeric type and otherwise the type prediction is a text type.

At Step 208 normalized field names are collated. The name collator (231) receives the normalized names (228) and generates the collated names (233). A name for a custom field may have several variants that use different spellings or abbreviations for the same words. The name collator (231) collates the different variants of the same name. For example, "po #", "po number", and "purchase order #" are different variants for the same field "purchase order number". The different variants have the same normalized name, which may be used as the value of the collected name for the collection of variants. Collation of the normalized names (228) may be performed for each combination company, industry, and country identifiers for the companies using the system. The collated names (233) are matched to the type predictions (238). For example, the collated name (234) is matched to the type prediction (239).

The count generator (241) counts the number of occurrences that collated names (233) appear in the normalized text (222). In one embodiment, the count generator (241) creates a sparse matrix with company identifiers for the rows, the collated names (233) as the columns, and the number of occurrences of a collated name in the transaction data (214) in the cells of the table. The sparse matrix may be converted to a coordinate format matrix with rows for the company identifiers, a column that identifies a collated name, and a column that identifies the count for the collated name.

At Step 210 field predictions and type predictions are selected. The selector (243) generates the prediction data (245) from the collated names (233), the normalized text (223), and the type predictions (238). In one embodiment, the selector (243) receives a coordinate format matrix from the count generator (241), which processed the collated names (233) and the normalized text (223). The coordinate format matrix may be sorted by the selector to order the rows of the coordinate format matrix from most counted collated names to least counted collated names. A threshold number of the most counted collated names (e.g., the top 10 collated names) may form the prediction data (246) with the type predictions (238) for the collated names identified in the coordinate format matrix. The prediction data (246) may be structured as a list with each element of the list including a collated name, a list of variants, and a type prediction. The list of the prediction data (246) has as many elements as the threshold number of rows selected from the coordinate format matrix.

Turning to FIG. 2B, the server application (262) generates and transmits the field predictions (277) from the transaction data (264). The transaction data (264) is a subset of the transaction data (263) and is for a transaction that the user of the client device (282) is inputting or adjusting using the client application (284). In one embodiment, the transaction data (264) is input to the client device (282) and then received from the client device (282) and stored to the repository (287). In one embodiment, the transaction data (264) is retrieved from the repository (287) and presented to the client device (282) for adjustment by the user.

The transaction text (266) is extracted from the transaction data (264). The transaction text (266) may be extracted from multiple free form text fields from the transaction data (264) and combined (e.g., appended). In one embodiment, the transaction text (266) is extracted from a line item description and a memo text field with text from the line item description appended to text from the memo text field.

At Step 252, the transaction text (266), from the transaction data (264), is normalized to generate the normalized text (270). In one embodiment the transaction text (266) is normalized by the text normalizer (268). The text normalizer (268) may convert text to lower case, remove stop words and punctuation, trim white space, correct spelling, stem words, etc. The text normalizer (268) may be the same as the text normalizer (220) (of FIG. 2A) used by the training application (212) (of FIG. 2A).

At Step 254, the field predictions (276) are generated from the normalized text (270). The prediction generator (272) uses the prediction data (274) with the normalized text (270) to generate the field predictions (276) with the corresponding type predictions (279). In one embodiment, the prediction data (274) is retrieved from the prediction data (273) of the repository (287). The retrieval selects the prediction data (274) from the prediction data (273) using a company identifier, an industry identifier, and a country identifier that corresponds to the company identifier, industry identifier, and country identifier for the organization of the user of the client device (282). The prediction data (274) includes a list of collated names (with variants). The prediction generator (272) matches the words and phrases in the normalized text (270) to the collated names and variants of the prediction data (274) to identify the field predictions (276). In one embodiment, when multiple words or phrases from the normalized text (270) match to a collated name, the prediction generator (272) may match the word or phrase having the longest string length or the most words to the collated name. The type predictions (279) are linked to the field predictions (276) as previously determined by the training application (212) (of FIG. 2A).

At Step 256, the field predictions (277) and the type predictions (280) are presented to the client device (282). Each of the field predictions (276) and corresponding type predictions (279) may be transmitted to the client device (282) and displayed. The client application (284) may display each of the field predictions (276) and receive a selection of the field prediction (277). In response to selecting the field prediction (277), the client application (284) may display a window that is prepopulated with the field prediction (277) and the type prediction (280). The user may then select to add a custom field to the transaction data (264). The custom field added may use the name from the field prediction (277) and the type from the type prediction (280).

At Step 258, the transaction data (264) is updated. The server application (262) may receive the update (from the client device (282)), which includes the name and type for a custom field to add to the transaction data (264). The server application (262) may store the update to the transaction data (264) to the repository (287).

FIGS. 3A, 3B, 3C, and 3D show examples of systems and interfaces that add custom fields to transaction data using field predictions. The embodiments shown in FIGS. 3A, 3B, 3C, and 3D may be combined and may include or be included within the features and embodiments described in the other figures of the application. The features and elements of FIGS. 3A, 3B, 3C, and 3D are, individually and as a combination, improvements to machine learning technology and computing systems. The various features, elements, widgets, components, and interfaces shown in FIGS. 3A, 3B, 3C, and 3D may be omitted, repeated, combined, and/or altered as shown. Accordingly, the scope of the present disclosure should not be considered limited to the specific arrangements shown in FIGS. 3A, 3B, 3C, and 3D.

Figure 3A:
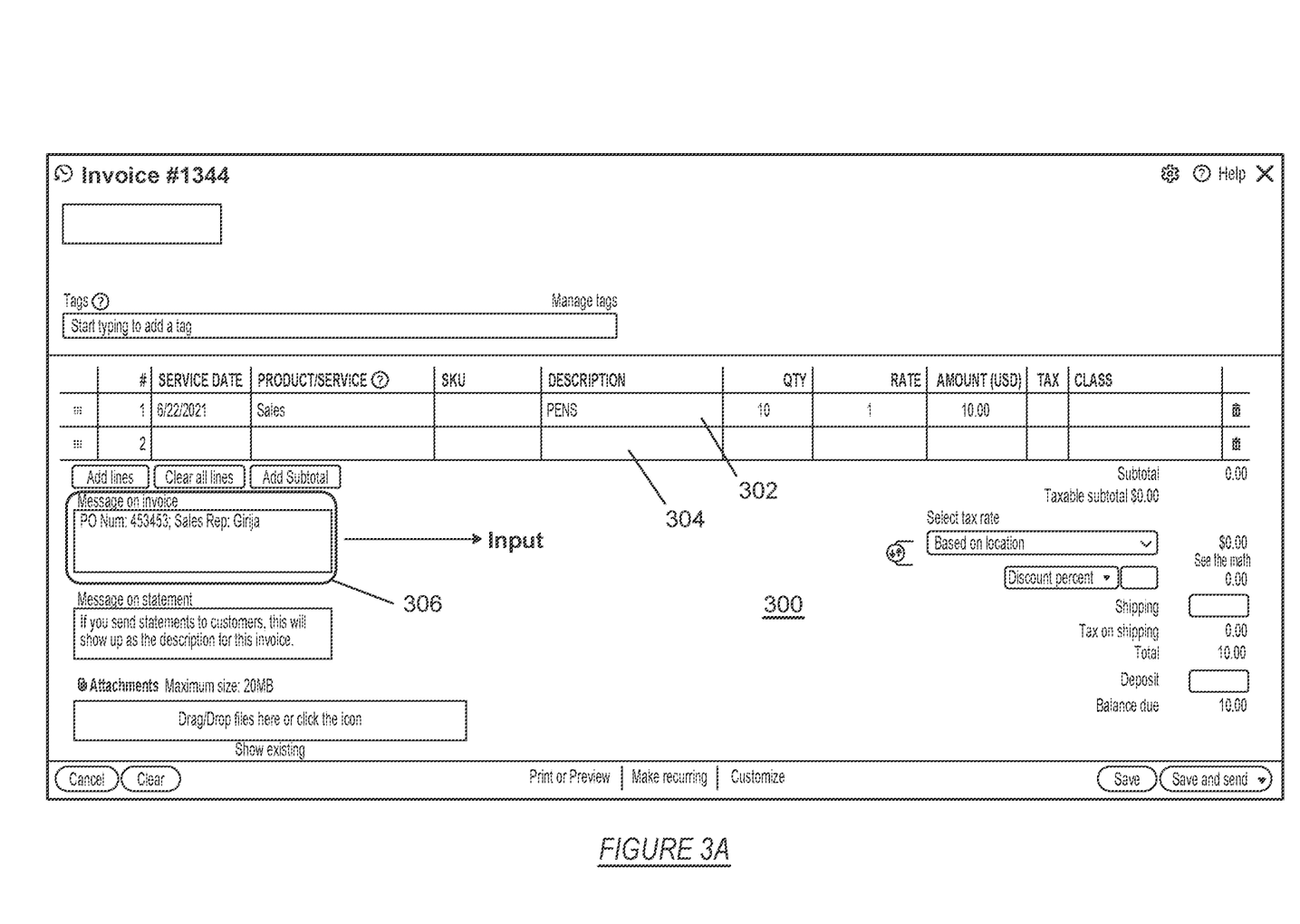
FIG. 3A, FIG. 3B, FIG. 3C, and FIG. 3D show examples in accordance with disclosed embodiments.

Turning to FIG. 3A, the user interface (300) is a graphical user interface that presents and collects data for a transaction (e.g., "Invoice #1002"), including free form text. The user interface (300) includes several interactive user interface elements that display data about a transaction. The user interface (300) includes the line item (302), the line item (304), and the message field (306).

The first line item (302) includes transaction data for the transaction. The transaction is the purchase of 10 pens for a total amount of $10.00.

The second line item (304) is a second line item for the transaction. The second line item (304) is blank.

The message field (306) is a text field that includes free form text. The text from the message field (306) is extracted and processed by the system to identify field predictions and types based on the words and phrases in the text of the message field (306) for the transaction.

If the description for the second line item (304) included text in the description field, then the text from the description field for the line item (304) may be extracted and combined with the text from the message field (306) to identify field predictions for the free form text for the transaction shown with the user interface (300). Since the other fields (outside of the description field) of the line item (302) include data, the text from the description field from the line item (302) is not extracted and not processed to identify field predictions.

Figure 3B:
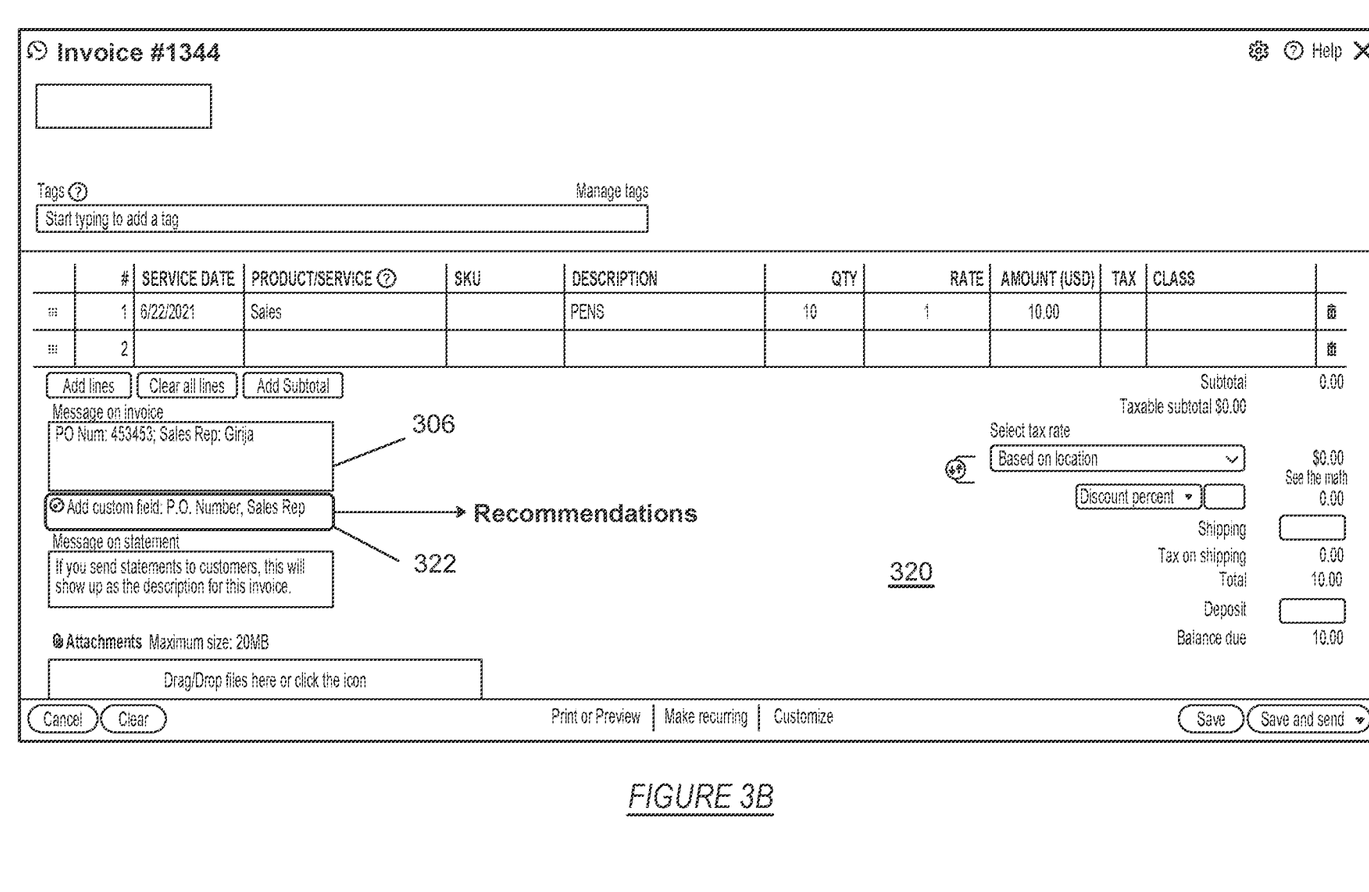

Turning to FIG. 3B, the user interface (320) is updated from the user interface (300) in response to the free form text being entered into the message field (306). The user interface (320) is updated to include the recommendation field (322).

The recommendation field (322) includes links with text that identifies the field predictions generated from the text from the message field (306). The field prediction "P.O. Number" is from the free form text "PO Num" and the field prediction "Sales Rep" is from the free form text "Sales Rep". The field predictions are generated with prediction data trained for the company, industry, and country of the organization of the user operating the client device executing the user interface (320).

Figure 3C:
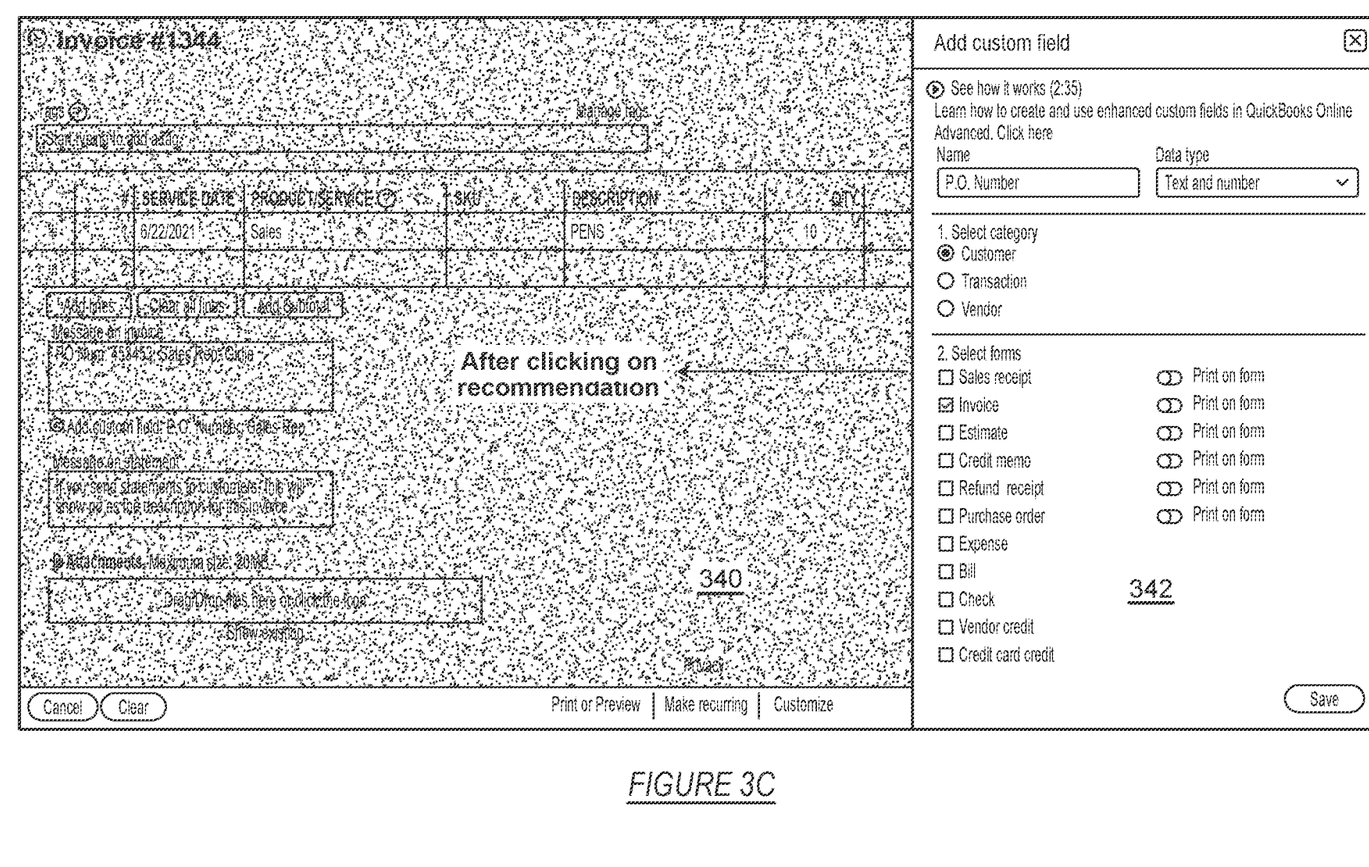

Turning to FIG. 3C, the user interface (340) is updated from the user interface (320) in response to selection of the "P.O. Number" link from the recommendation field (322). The user interface (340) is updated to include the window (342).

The window (342) is a form used to enter a custom field for the transaction displayed in the user interface (340). The window (342) is prepopulated with the name "P.O. Number" from the field prediction and with the data type "Text and number" from the type prediction linked to the field prediction.

Additional properties for the custom field may be set using additional elements of the window (342). The category of transactions to which the custom field from the field prediction should be applied (e.g., one of "customer", "transaction", or "vendor"). Also, the forms that may include the custom field may be selected (e.g., one or more of "sales receipt", "invoice", "estimate", etc.).

Figure 3D:
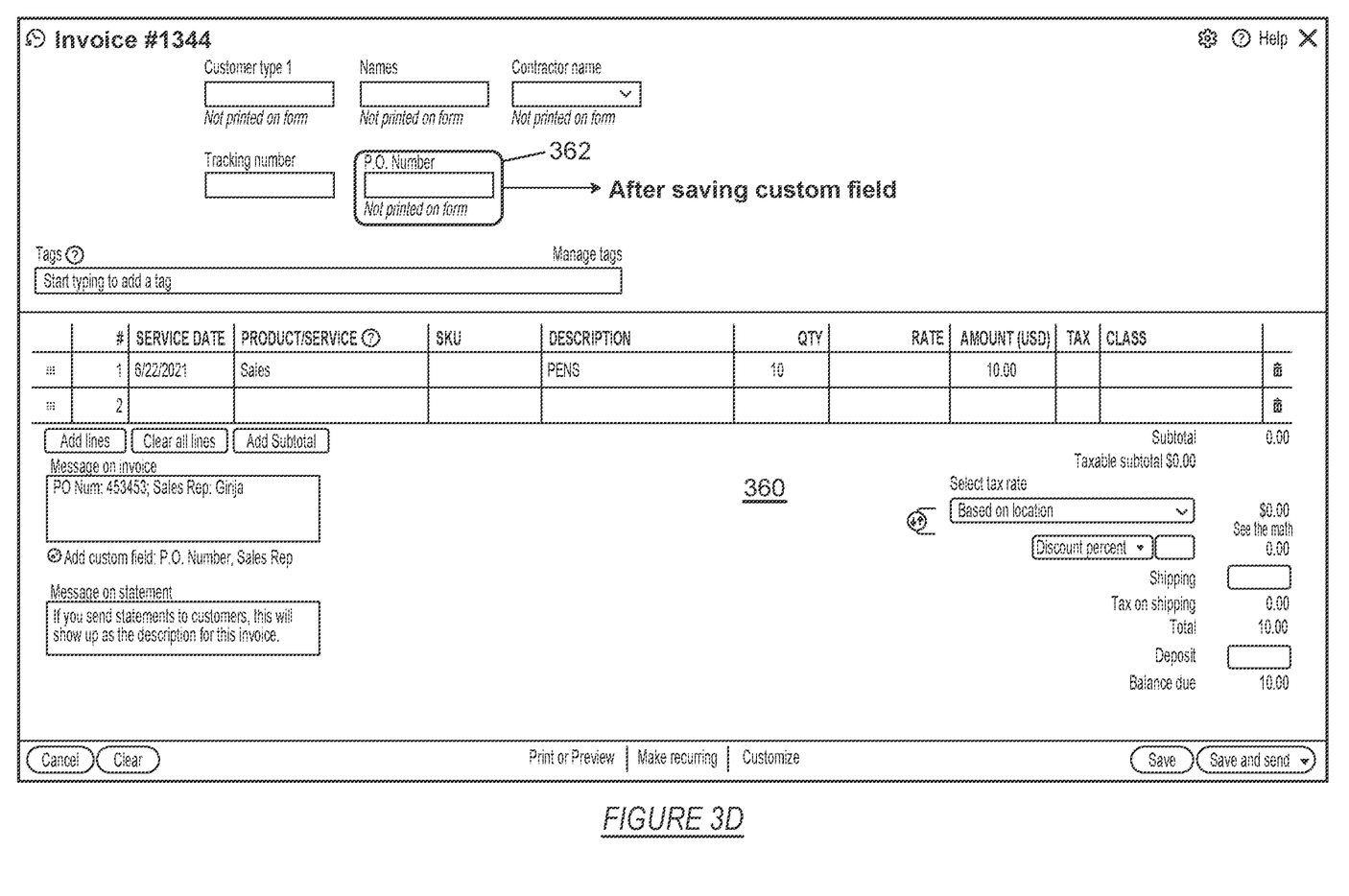

Turning to FIG. 3D, the user interface (360) is updated from the user interface (340) in response to saving the custom field in the window (342) (of FIG. 3C). The user interface (360) is updated to include the field (362) for the "P.O. Number" (purchase order number), which is included in the transaction data for the transaction but will not be printed when the invoice ("#1002") is printed.

Embodiments of the invention may be implemented on a computing system. Any combination of a mobile, a desktop, a server, a router, a switch, an embedded device, or other types of hardware may be used. For example, as shown in FIG. 4A, the computing system (400) may include one or more computer processor(s) (402), non-persistent storage (404) (e.g., volatile memory, such as a random access memory (RAM), cache memory), persistent storage (406) (e.g., a hard disk, an optical drive such as a compact disk (CD) drive or a digital versatile disk (DVD) drive, a flash memory, etc.), a communication interface (412) (e.g., Bluetooth interface, infrared interface, network interface, optical interface, etc.), and numerous other elements and functionalities.

The computer processor(s) (402) may be an integrated circuit for processing instructions. For example, the computer processor(s) (402) may be one or more cores or micro-cores of a processor. The computing system (400) may also include one or more input device(s) (410), such as a touchscreen, a keyboard, a mouse, a microphone, a touchpad, an electronic pen, or any other type of input device.

The communication interface (412) may include an integrated circuit for connecting the computing system (400) to a network (not shown) (e.g., a local area network (LAN), a wide area network (WAN) such as the Internet, a mobile network, or any other type of network) and/or to another device, such as another computing device.

Further, the computing system (400) may include one or more output device(s) (408), such as a screen (e.g., a liquid crystal display (LCD), a plasma display, a touchscreen, a cathode ray tube (CRT) monitor, a projector, or other display device), a printer, an external storage, or any other output device. One or more of the output device(s) (408) may be the same or different from the input device(s) (410). The input and output device(s) (410 and (408)) may be locally or remotely connected to the computer processor(s) (402), non-persistent storage (404), and persistent storage (406). Many different types of computing systems exist, and the aforementioned input and output device(s) (410 and (408)) may take other forms.

Software instructions in the form of computer readable program code to perform embodiments of the invention may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system (400) shown in FIG. 4A, or a group of nodes combined may correspond to the computing system (400) shown in FIG. 4A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (400) may be located at a remote location and connected to the other elements over a network.

Figure 4B:
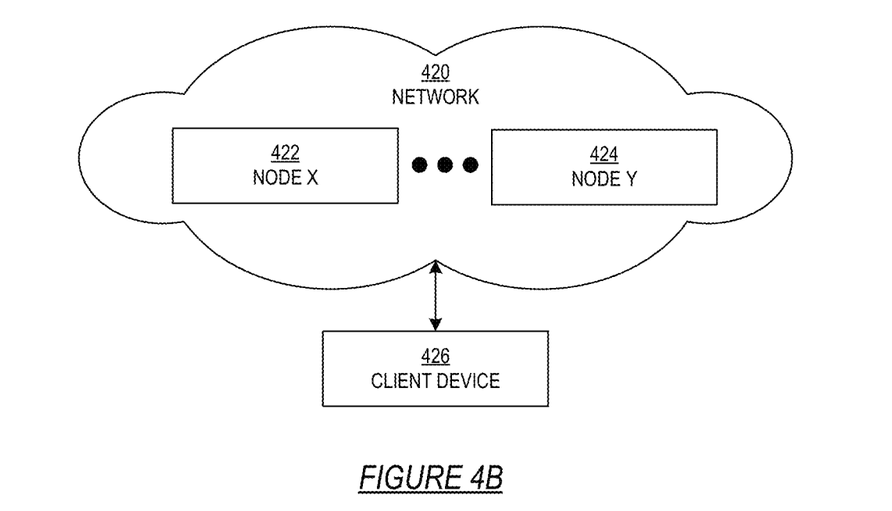

Although not shown in FIG. 4B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system (400) shown in FIG. 4A. Further, the client device (426) may include and/or perform all or a portion of one or more embodiments of the invention.

The computing system (400) or group of computing systems described in FIGS. 4A and 4B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system (400) in FIG. 4A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system (400) of FIG. 4A, while performing one or more embodiments of the invention, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (400) in FIG. 4A may implement and/or be connected to a data repository. For example, one type of data repository is a database. A database is a collection of information configured for ease of data retrieval, modification, re-organization, and deletion. A Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (400) of FIG. 4A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (400) of FIG. 4A and the nodes (e.g., node X (422), node Y (424)) and/or client device (426) in FIG. 4B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
   normalizing transaction text from transaction data to generate normalized text;
   selecting a field prediction and a type prediction using prediction data and the normalized text,
      wherein the prediction data is generated using a machine learning model trained to identify field predictions from free form text, and
      wherein the machine learning model is trained by:
         normalizing training transaction text from the training transaction data to generate the training normalized text,
         normalizing custom field names from the training transaction data to generate the normalized field names, and
         collating normalized field names to generate collated field names by counting occurrences of training normalized text with the normalized field names in training transaction data;
   presenting the field prediction and the type prediction to a client device; and
   updating, in response to user input from the client device, the transaction data with the field prediction.

2. The method of claim 1, further comprising:
   training the machine learning model by:
      identifying training type predictions for the normalized field names; and
      selecting a threshold number of field predictions using the collated field names and the training type predictions to generate prediction data.

3. The method of claim 1, further comprising:
   collating the normalized field names using industry identifiers, country identifiers, and company identifiers.

4. The method of claim 1, further comprising:
   selecting a threshold number of field predictions on a daily basis.

5. The method of claim 1, further comprising:
   updating the training transaction data to include the transaction data updated in response to the user input.

6. The method of claim 1, further comprising:
   extracting the transaction text from a line item description, linked to at least one of a null item identifier and a null amount, of a transaction in the transaction data.

7. The method of claim 1, further comprising:
   extracting the transaction text from a message in a header of a transaction in the transaction data.

8. The method of claim 1, further comprising:
   collating the normalized field names by identifying a plurality of variants for a normalized field name of the normalized field name.

9. The method of claim 1, further comprising:
   selecting a threshold number of field predictions to include a plurality of variants for a normalized field name of the normalized field name.

10. The method of claim 1, further comprising:
    presenting the field prediction and the type prediction in a window in response to selection of a link.

11. A system comprising:
    at least one server comprising at least one processor;
    a machine learning model; and
    an application, executing instructions on the at least one server and the at least one processor, the instructions configured for:

normalizing transaction text from transaction data to generate normalized text;

selecting a field prediction and a type prediction using prediction data and the normalized text, wherein the prediction data is generated using the machine learning model trained to identify field predictions from free form text, and normalizing training transaction text from the training transaction data to generate the training normalized text, normalizing custom field names from the training transaction data to generate the normalized field names, and collating normalized field names to generate collated field names by counting occurrences of training normalized text with the normalized field names in training transaction data;

presenting the field prediction and the type prediction to a client device; and updating, in response to user input from the client device, the transaction data with the field prediction.

12. The server of claim 11, wherein the application is further configured for:

receiving the transaction text as free form text from a client device responsive to the client device receiving the transaction text as user input.

13. The server of claim 11, wherein the application is further configured for:

presenting the field prediction in a link displayed with the transaction data.

14. The server of claim 11, wherein the application is further configured for:

presenting a window prepopulated with the field prediction and the type prediction in response to selection of a link for the field prediction.

15. The server of claim 11, wherein the application is further configured for:

adding, to the transaction data, a custom field corresponding to the field prediction in response to selection of a save button in a window prepopulated with the field prediction.

16. The server of claim 11, wherein the application further comprises:

a training application, executing on the at least one server, configured for:

training the machine learning model by:

identifying training type predictions for the normalized field names; and selecting a threshold number of field predictions using the collated field names and the training type predictions to generate prediction data.

17. The server of claim 11, wherein the application is further configured for:

collating the normalized field names using industry identifiers, country identifiers, and company identifiers.

18. The server of claim 11, wherein the application is further configured for:

selecting a threshold number of field predictions on a daily basis.

19. A method comprising:

receiving transaction text, for transaction data, as free form text from a client device responsive to the client device receiving the transaction text from an input field of a form displayed on the client device;

normalizing the transaction text to generate normalized text;

selecting a field prediction and a type prediction using prediction data and the normalized text, wherein the prediction data is generated using a machine learning model trained to identify field predictions from the free form text, and wherein the machine learning model is trained by:

normalizing training transaction text from the training transaction data to generate the training normalized text, normalizing custom field names from the training transaction data to generate the normalized field names, and collating the normalized field names to generate collated field names by counting occurrences of training normalized text with the normalized field names in training transaction data; and presenting the field prediction and the type prediction to the client device, wherein the field prediction is displayed on the form.

20. The method of claim 19, further comprising:

training the machine learning model by:

identifying training type predictions for the normalized field names; and selecting a threshold number of field predictions using the collated field names and the training type predictions to generate prediction data.

\* \* \* \* \*